April 9, 1940.  G. A. TINNERMAN  2,196,711

FASTENING DEVICE

Original Filed Jan. 7, 1937

INVENTOR.
GEORGE A. TINNERMAN
BY Bates, Golrick & Teare
ATTORNEYS

Patented Apr. 9, 1940

2,196,711

UNITED STATES PATENT OFFICE 2,196,711

FASTENING DEVICE

George A. Tinnerman, Rocky River, Ohio, assignor, by mesne assignments, to Tinnerman Products, Inc., Cleveland, Ohio, a corporation of Ohio Original application January 7, 1937, Serial No. 119,415. Divided and this application May 6, 1939, Serial No. 272,180

6 Claims. (Cl. 85—32)

This invention relates to threadless fasteners, and particularly to those which are adapted to be used in an assembly wherein it is necessary for the fastener to retain itself in bolt receiving position prior to the insertion of the bolt. The present application is a division of my copending application Serial No. 119,415 filed January 7, 1937.

Previous forms of fastening devices of this nature have not provided any means for closing the aperture through which the fastener has been inserted, and where such fasteners have been used, for example, in connection with the assembly of an automobile body, the opening enabled water and other foreign matter to enter the body. Similar conditions have existed in refrigerator cabinets where it is essential that the insulation carrying compartments be sealed against the entrance of moisture, and in railway cars, airplanes, steel tanks, furnaces and associated types of products.

An object of the present invention, therefore, is to make a threadless fastener which possesses adequate power for holding either a threaded member, or any other article, and which at the same time, will have such relation to the opening through which the fastener is inserted that it will be held rigidly in article receiving position, and will automatically seal the opening through which the fastener was inserted against the entrance of moisture or foreign material.

Figure 1:
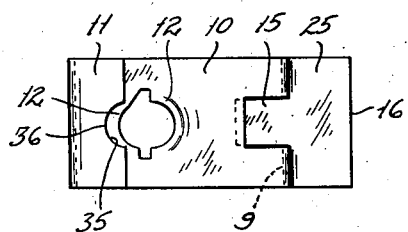
Figure 2:
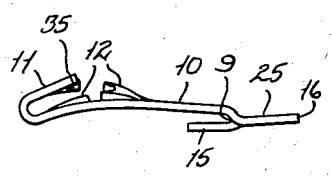
Figure 3:
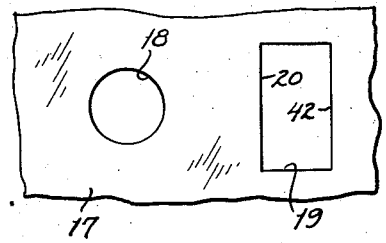

This invention is shown in various forms in the drawing, wherein Fig. 1 is a top plan view of one form of the invention; Fig. 2 is a side view of the fastener that is shown in Fig. 1; Fig. 3 is a top plan of an article having openings therein for receiving the fastener, and for receiving a threaded member with which the fastener is intended to be used and Fig. 4 is a vertical section taken through a plurality of parts that are joined together by means of a fastener embodying my invention.

The fastener which is illustrated in the drawing has a body portion 10, one end of which is bent upwardly and backwardly upon itself, as at 11, and which cooperates with bent portions 12 to provide a bolt-receiving portion for engaging a multiple turn on the shank of a threaded member 13. To hold the fastener in bolt-receiving position upon a part to be joined, I provide a clip at the end opposite the turned-up portion 11 and I prefer to form the clip out of the material which comprises the body of the fastener. In the form illustrated, the clip embodies a tongue 15 which is struck downwardly from the fastener body at a point spaced inwardly from the end 16 thereof, and sufficiently far to engage the underside of one of the parts to be joined.

Figure 4:
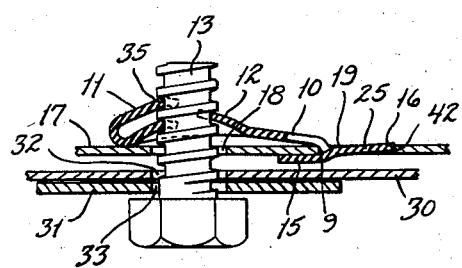

The engagement between the top and bottom sides of a part to be joined is illustrated in Fig. 4 wherein 17 represents a plate having a bolt-receiving aperture 18 therein and a fastener receiving aperture 19 therein. The tongue 15 is spaced sufficiently far from the body of the fastener, that when the edge 20 of the opening 19 engages the crotch or shoulder 9 between the tongue 15 and the fastener body, the bolt receiving aperture on the fastener will be in registration with the bolt opening 18 on the part 17.

To attach the fastener to the panel, the opening 19 on the part 17 has one dimension which is substantially the same as the width of the fastener body and with just enough clearance to admit the fastener readily, while the transverse dimension is sufficient to permit endwise movement of the fastener through the opening during the assembly operation. When the crotch on the fastener is in engagement with the edge 20, however, part of the opening 19 would normally remain unsealed, and whenever the fastener is used for assembling the fender on an automobile body, the unsealed part would permit the entrance of water, exhaust vapors, dirt and foreign matter into the body. To conceal such opening, therefore, I provide on the fastener body, an extension 25 which fits snugly within the opening after the fastener has been inserted into place. By utilizing a close-fit between the extension and the walls of the opening 19, the end 16, of the extension can be snapped into abutting engagement with the wall 42 of the opening 19 as the final act in the assembly operation. Thereupon, the fastener is securely held in bolt-receiving position, and at the same time the opening through which the fastener is inserted is adequately sealed.

To attach a fastener made in accordance with my invention, the end of the thread engaging portions thereon may be inserted through the opening 19 from the side shown as the bottom in Fig. 4 until the part 17 adjacent the wall 20 enters the space between the fastener body and the tongue 15. Thereupon the fastener is pushed forwardly until the end 16 of the extension snaps into abutting engagement with the wall 42. Thereafter the part 30 and the washer 31 having openings 32 and 33 therein in registration with the opening 18 may be brought into position with respect to the part 17 and the bolt 13 may be inserted through the openings. At such time the portions 12 engage one turn of the bolt thread and the thread engaging portion 35 on the upturned part 11 engages another turn of the bolt thread. The portion 35 is preferably made in the shape of the helix on the marginal portion of a notch 36 that is illustrated at the end of the upturned part 11. Thus, when the bolt is tightened all of the parts are brought into cooperating relationship.

An advantage of a fastener which is made in accordance with my invention is the fact that it is self-sustaining in bolt, or article, receiving position, and that it may be easily manufactured by relatively simple tools. A further advantage is the fact that when the fastener is used in those locations where the assembly opening must be sealed, the closure or sealing is effected automatically when the fastener is locked in bolt or article receiving position.

I claim:

1. A fastening device comprising a sheet metal strip of uniform width throughout its length and applicable to a part to be joined through an assembly slot therein, the fastener having one portion overlying the part and another portion underlying said part, one of said portions having means formed thereon for engaging one turn of a threaded member and having the end thereof bent upwardly and inwardly and engaging another turn of the threaded member, said fastener having a shoulder adjacent the junction of the overlying and underlying portions and having means for engaging the opposite wall of the slot in the part to be joined, and for locking the fastener to said part.

2. The combination of a support provided with a bolt passage and an assembling slot, a part connected to said support and having a bolt passage in registration with the bolt passage in said support and a one-piece connecting device comprising a pair of members, one of which is provided with integral bolt receiving means deformed therefrom and is applicable to the assembling slot from one side of the support to be positioned on the opposite side thereof with the bolt receiving means overlying the bolt passage and in position to receive a bolt fastening to connect said part to the support, said device having spaced shoulders thereon for engaging opposite walls in the assembling slot for locking the device in the support and having means thereon between the shoulders for sealing the assembling slot.

3. In combination with a support provided with an assembling opening, a sheet metal fastening device comprising a body including a tongue struck out of the plane thereof and extending in spaced relation thereto, said tongue and body cooperating to engage opposite faces of the support through said opening and said body having an extension which substantially seals said opening and extends in the same general direction as the body, said extension being provided with means engageable with a side wall of said opening and cooperating with said tongue to lock the device in the applied fastening position, and said body including means deformed therefrom adapted to receive a bolt fastening for retaining an object relative to the support.

4. In combination with a support provided with an assembling opening, a fastening device comprising a body including a tongue struck out of the plane of said body, said tongue and body cooperating to provide a crotch for receiving the support and engaging one wall of said opening and said body having an extension substantially sealing said opening in the applied fastening position, said extension including means engaging a wall of the opening opposite that engaged by the crotch of the fastening device to lock the device in such applied fastening position, said body comprising bolt receiving means for receiving a bolt fastening in securing an object with respect to the support.

5. The combination of a support provided with a bolt passage and an assembling slot, a part to be connected to said support, and a connecting device comprising a body member carrying bolt engaging means and including an extension and a tongue struck therefrom to extend in spaced relation thereto, said body member being applicable through the assembling slot from one side of the support to be positioned on the opposite side thereof with the bolt engaging means overlying the bolt passage and in position to receive a bolt fastening to connect said part to the support, said body member and tongue cooperating to engage opposite faces of the support in maintaining the connecting device in applied fastening position thereon, said extension substantially sealing the slot and including means engaging a wall thereof to lock the device in such applied fastening position.

6. The combination of a support provided with a bolt passage and an assembling slot, a part to be connected to said support, and a one-piece sheet metal connecting device comprising a body member having integral bolt engaging means deformed therefrom, said body member including an extension and a tongue struck therefrom to extend in spaced relation thereto, said body member being applicable through the assembling slot from one side of the support to be positioned on the opposite side thereof with the bolt engaging means overlying the bolt passage and in position to receive a bolt fastening to connect said part to the support, said body member and tongue cooperating to engage opposite faces of the support in maintaining the connecting device in applied position thereon, said extension substantially sealing the slot and being provided with means for engaging a side wall thereof to lock the device in such applied fastening position.

GEORGE A. TINNERMAN.